Patented Oct. 28, 1930

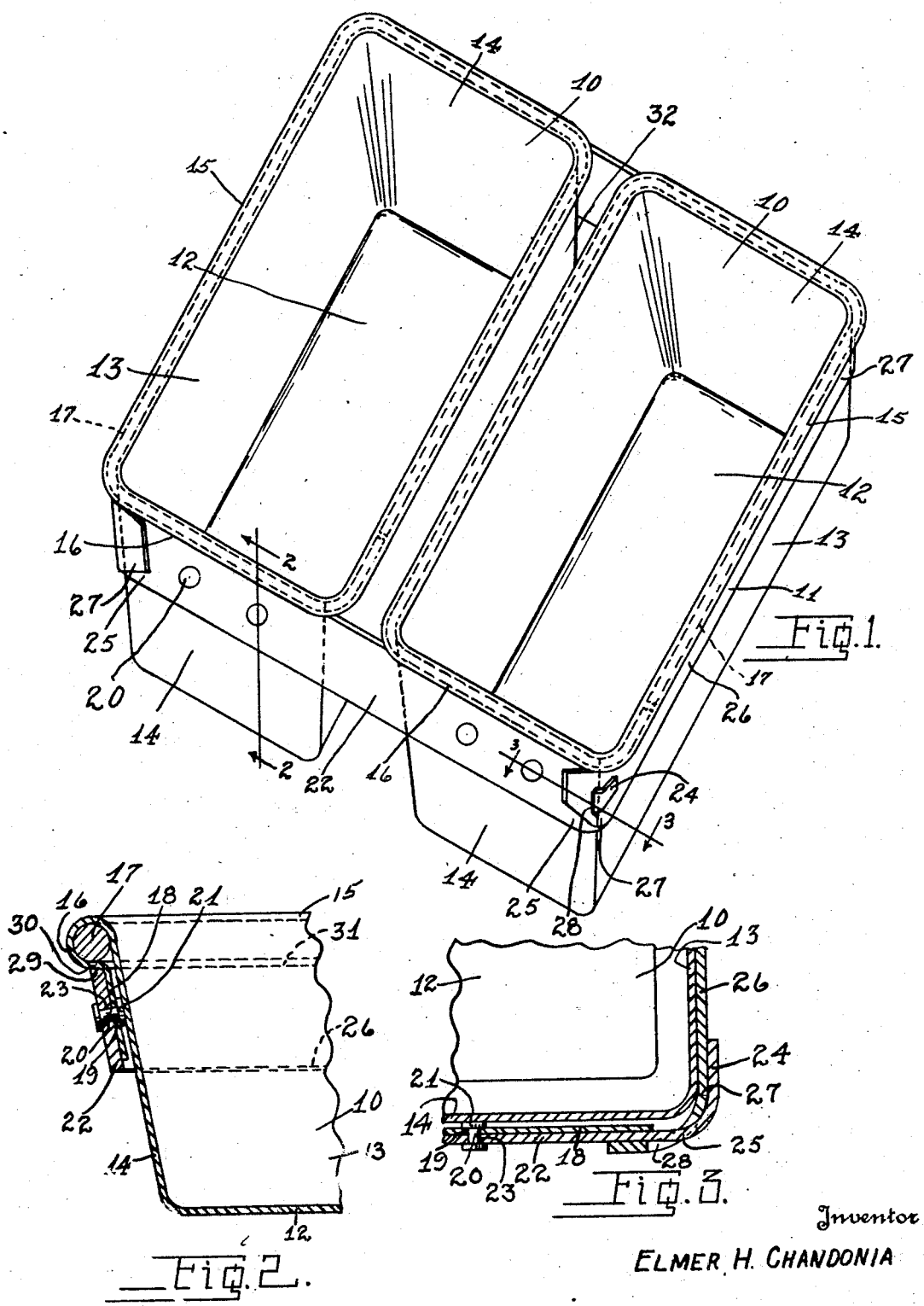

1,780,002

UNITED STATES PATENT OFFICE

ELMER H. CHANDONIA, OF DAYTON, KENTUCKY, ASSIGNOR TO LOCKWOOD MANUFACTURING COMPANY, OF CINCINNATI, OHIO, A CORPORATION OF OHIO

BAKING-PAN UNIT

Application filed June 24, 1927. Serial No. 201,250.

This invention relates to improvements in baking pans, particularly to improvements in baking pan units having two or more pans joined or secured together.

An object of this invention is to provide a more rigid connection between two or more pans of a unit.

Another object of this invention is to provide an improved means for locking or tying adjacent pans to one another and for reinforcing the edges of the individual baking pans.

These and other objects are attained by the means described herein and disclosed in the accompanying drawings, in which:

Fig. 1 is a perspective view of two pans joined together and reinforced with the improved method of this invention.

Fig. 2 is an enlarged sectional view taken on line 2—2 of Fig. 1.

Fig. 3 is an enlarged sectional view taken on line 3—3 of Fig. 1.

The invention comprises a plurality of pans 10 joined or secured together by a band 11 which surrounds the outer surface of the pans of the unit. A unit may comprise two pans, as shown in the drawing or it may comprise any reasonable number of pans intermediate the two pans here shown. Each pan comprises a bottom 12 from which side walls 13 and end walls 14 extend. The upper edge of the side wall is provided with a flange 15 and the upper edge of each end wall 14 is provided with a flange 16. A reinforcing wire or loop 17 is provided for reinforcing the upper end of each pan and is secured to the pans by bending or wrapping the flanges 15 and 16 around said loop.

Each of the end flanges 16 at its upper edge is provided with an integral extension or apron 18 which lies in close proximity with and substantially parallel to the end wall 14. The apron is first wrapped or bent around the loop 17 and is then bent downward in substantial parallelism with the end wall 14 and is provided with perforations 19. Rivets 20 are inserted in the perforations 19 and have their heads 21 intermediate the apron 18 and the end wall 16. The band 11 comprises straps that lie along the end walls of each pan and along the outer side walls of the end pans. The end straps 22, or the straps that lie along the end walls 14 of the pans, are provided with perforations 23 in alignment with the perforations 19 formed in the aprons 18 for receiving the rivets 20. A tongue 24 is provided on each end 25 of the end straps 22. Each of the side straps 26, or the straps that lie along the side wall 13 of the end pans, is provided at its opposite ends 27 with an elongated perforation 28 for receiving the tongues 24 formed on the end straps 22.

In assembling a unit of this invention the perforations or holes 19 are located in such a place that the upper edges 29 of the straps 22 contact the portion 30 of the apron 18 that underlies the loop 17. The strap 22 clamps the portion 30 of the apron between itself and the loop to form a rigid construction. The side straps 26 are then mounted in place having their upper edges 31 in contact with the loop 17 and the tongues 24 of the end straps 22 are inserted through the elongated perforations 28 and are bent parallel with the side straps therefore rigidly and securely locking the pans to one another and reinforcing the upper outer edges of the pans of the unit.

It should be noted that an air space 32 is provided between adjacent pans so that heated air and gas may pass between said pans to bake the contents of the pans.

What is claimed is—

1. A baking pan unit comprising a plurality of spaced pans, each pan comprising side walls and end walls, each of the walls having a flange at its upper edge, the end wall flanges being extended to provide an apron lying approximately parallel with and spaced from the end wall, the apron being provided with perforations, a band surrounding the unit and comprising a pair of end straps and a pair of side straps, the end straps lying across the end walls in contact with the aprons and being provided with perforations in alignment with the perforations in the end walls, a reinforcing loop surrounding each pan, and secured to each pan by bending the flanges of the pan around the said loop, the end straps contacting and clamping the apron between itself and the reinforcing loop, rivets extending through the perforations in the apron and end strap for securing the end strap to the apron, and means comprising interlocked ends of the straps each turned one over the other and about the corners of the unit, for securing the straps to one another and locking the individual pans into a unit.

2. A securing construction for pan units comprising the combination with spaced pans having depending end aprons, reinforcing wire loops surrounding each pan beneath the aprons, end straps disposed upon the outer faces of the aprons, means securing the end straps to the aprons, said means serving also to space the aprons from the pans, and side straps having apertures for receiving the ends of the end straps, the adjacent ends of the straps each being interlocked and turned at substantially right angles.

3. In a bake pan unit, the combination of a plurality of seamless bake pans disposed in parallelism, each pan having end and side walls, the endmost pans having corners comprising corners of the unit, a loop surrounding each pan, an integral substantially continuous flange on each pan turned upon the loop to form a bead, depending end aprons integral with the flanges, reinforcing straps non-rigidly connected at the corners of the unit, and means securing certain of the straps to the depending aprons, said means serving also to space the aprons from the pan ends.

4. In a bake pan unit, the combination of a plurality of seamless bake pans disposed in parallelism, each pan having end and side walls, the endmost pans having corners comprising corners of the unit, a loop surrounding each pan, an integral substantially continuous flange on each pan turned upon the loop to form a bead, depending end aprons integral with the flanges spaced from and extending substantially across the end walls of the pans, reinforcing straps non-rigidly connected at the corners of the unit, and means securing certain of the straps to the depending aprons.

5. In a bake pan unit, the combination of a plurality of bake pans disposed in parallelism, each pan having end and side walls, the endmost pans having corners comprising corners of the unit, a loop surrounding each pan, an integral substantially continuous flange on each pan turned upon the loop to form a bead, depending end aprons integral with the flanges, reinforced straps, non-rigidly connected at the corners of the unit, and means securing certain of the straps to the depending aprons, said means serving also to space the aprons from the pan ends.

6. In a multiple pan the combination of a plurality of spaced pans having aligned end walls, each pan end wall having an integral flange turned upon the pan wall and extending in spaced parallelism along its associated end wall, a reinforcing loop between each end wall and flange at the place of turn of the flange on the end wall, an encircling band for the plurality of spaced pans and contacting the flanges on the outer faces of said flanges and means holding the flanges and band in fixed relation and spaced from the end walls of the pans.

In testimony whereof, I have hereunto subscribed my name this 21st day of June, 1927.

ELMER H. CHANDONIA.